United States Patent
Shioya et al.

(10) Patent No.: US 12,319,354 B2
(45) Date of Patent: Jun. 3, 2025

(54) STEERING SUPPORT

(71) Applicants: FUTABA INDUSTRIAL CO., LTD., Okazaki (JP); TOYOTA JIDOSHA KABUSHIKI KAISHA, Toyota (JP)

(72) Inventors: Yuta Shioya, Okazaki (JP); Masahito Yabuoshi, Chiryu (JP)

(73) Assignees: Futaba Industrial Co., Ltd., Okazaki (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/358,163

(22) Filed: Jul. 25, 2023

(65) Prior Publication Data

US 2024/0034412 A1    Feb. 1, 2024

(30) Foreign Application Priority Data

Aug. 1, 2022 (JP) ................................. 2022-122875

(51) Int. Cl.
  *B62D 25/14* (2006.01)
  *B62D 1/16* (2006.01)

(52) U.S. Cl.
  CPC ............. *B62D 25/145* (2013.01); *B62D 1/16* (2013.01)

(58) Field of Classification Search
  CPC ................................ B62D 25/145; B62D 1/16
  See application file for complete search history.

(56) References Cited

U.S. PATENT DOCUMENTS

| 2016/0325773 | A1  | 11/2016 | Leanza |
| 2018/0099699 | A1* | 4/2018  | Kurita ...................... B62D 1/16 |
| 2021/0253154 | A1* | 8/2021  | Nishizawa ............... B62D 1/16 |

FOREIGN PATENT DOCUMENTS

| JP | 2004230944 A  | 8/2004 |
| JP | 2004231038 A  | 8/2004 |
| JP | 2017094763 A  | 6/2017 |
| JP | 6593697    B2 | 10/2019 |
| JP | 2021115991 A  | 8/2021 |

OTHER PUBLICATIONS

Notice of Reasons for Refusal (Office Action) for Japanese Patent Application No. 2022-122875 mailed Feb. 13, 2024, 8 pages including English translation.

* cited by examiner

*Primary Examiner* — Karen Beck
(74) *Attorney, Agent, or Firm* — Withrow + Terranova, PLLC; Vincent K. Gustafson

(57) ABSTRACT

A steering support comprises front and rear steering coupling members, first, second, and third body coupling members, first and second wall parts, which are made by an integral molding. The front and rear steering coupling members are coupled to a steering. The first body coupling member located at a front end in a front-rear direction of a vehicle, the second body coupling member located at a first end in a vehicle-width direction, and the third body coupling member located at a second end in the vehicle-width direction are coupled to a body of a vehicle. The first wall part connects the rear steering coupling member and the second body coupling member and has a substantially flat surface. The second wall part connects the front steering coupling member and the second body coupling member and has a substantially flat surface.

6 Claims, 4 Drawing Sheets

STEERING SUPPORT

CROSS-REFERENCE TO RELATED APPLICATIONS

This application claims the benefit of priority based on Japanese Patent Application No. 2022-122875 filed on Aug. 1, 2022 with the Japan Patent Office, and the entire disclosure of Japanese Patent Application No. 2022-122875 is incorporated by reference herein.

BACKGROUND

The present disclosure relates to a steering support configured to support a steering of a vehicle.

Japanese Unexamined Patent Application Publication No. 2021-115991 discloses a steering support made up by joining several members, such as an upper main body member and a lower main body member constituting a main body and a projection protruding forward from the center of the upper main body member. The steering support is a member to support the steering, and fixed to a body of a vehicle through brackets and the like.

SUMMARY

A load input from the steering is transmitted to the body of the vehicle through the steering support. However, a stress might be concentrated on a joined portion between the members in the steering support when the load is transmitted. Whereas, the steering support of Japanese Unexamined Patent Application No. 2021-115991 comprises many joined portions of the multiple members. Thus, the stress may be concentrated on these joined portions, which may decrease the stiffness of the steering support. The decrease in the stiffness of the steering support may impair a steering feeling of the steering.

One aspect of the present disclosure is preferably to provide a technique for improving the stiffness of the steering support and improving the steering feeling of the steering.

MEANS TO SOLVE THE PROBLEM

One aspect of the present disclosure is a steering support configured to be installed in a vehicle in a state of being extended in a vehicle-width direction to support a steering of the vehicle. The steering support comprises a front steering coupling member, a rear steering coupling member, a first body coupling member, a second body coupling member, a third body coupling member, a first wall part, and a second wall part. The front steering coupling member is configured to be coupled to the steering. The rear steering coupling member is provided rearward of the front steering coupling member and configured to be coupled to the steering. The first body coupling member is located at a front end in a front-rear direction of the vehicle and configured to be coupled to a body of the vehicle. The second body coupling member is located at a first end in the vehicle-width direction and configured to be coupled to the body of the vehicle. The third body coupling member is located at a second end in the vehicle-width direction and configured to be coupled to the body of the vehicle. The first wall part connects the rear steering coupling member and the second body coupling member to each other and has a substantially flat surface. The second wall part connects the front steering coupling member and the second body coupling member to each other and has a substantially flat surface. The front steering coupling member, the rear steering coupling member, the first body coupling member, the second body coupling member, the third body coupling member, the first wall part and the second wall part are made by an integral molding.

In such a configuration, respective coupling members are integrally molded. The front steering coupling member and the rear steering coupling member are connected to the second body coupling member through the substantially flat first wall part and second wall part. Thus, when the load input from the steering is transmitted from the front steering coupling member and the rear steering coupling member to the second body coupling member, a stress is less likely to be concentrated on a specific part. As a result, it is possible to improve the stiffness of the steering support and improve the steering feeling of the steering.

In one embodiment of the present disclosure, the integral molding may be performed by die-casting. In such a configuration, when the load input from the steering is transmitted from the front steering coupling member and the rear steering coupling member to the second body coupling member, the stress is less likely to be concentrated on a specific part. As a result, it is possible to improve the stiffness of the steering support and improve the steering feeling of the steering.

One embodiment of the present disclosure may further comprise a third wall part and a fourth wall part. The third wall part connects the rear steering coupling member and the first body coupling member to each other and has a substantially flat surface. The fourth wall part connects the front steering coupling member and the first body coupling member to each other and has a substantially flat surface. The third wall part and the fourth wall part may be made by the integral molding together with the front steering coupling member, the rear steering coupling member, the first body coupling member, the second body coupling member, the third body coupling member, the first wall part, and the second wall part. In such a configuration, the front steering coupling member and the rear steering coupling member are connected to the first body coupling member through the substantially flat third wall part and fourth wall part. Thus, when the load input from the steering is transmitted from the front steering coupling member and the rear steering coupling member to the first body coupling member, the stress is also less likely to be concentrated on a specific part. As a result, the stiffness of the steering support can be further improved.

One embodiment of the present disclosure may further comprise a rib. The rib is located between the first body coupling member and the second body coupling member, and the rib extends from the second wall part, and the rib has a substantially flat surface. The rib may be made by the integral molding together with the front steering coupling member, the rear steering coupling member, the first body coupling member, the second body coupling member, the third body coupling member, the first wall part, and the second wall part. In such a configuration, the substantially flat rib is provided between the first body coupling member and the second body coupling member. Thus, the stress generated in each of the first body coupling member and the second body coupling member by the transmission of the load input from the steering can be distributed between the first body coupling member and the second body coupling member, making it possible to inhibit the concentration of the stress in one of the body coupling members. As a result, the stiffness of the steering support can be further improved.

One embodiment of the present disclosure may further comprise a fifth wall part and a sixth wall part. The fifth wall part connects the rear steering coupling member and the third body coupling member to each other and has a substantially flat surface. The sixth wall part connects the front steering coupling member and the third body coupling member and has a substantially flat surface. The fifth wall part and the sixth wall part may be made by the integral molding together with the front steering coupling member, the rear steering coupling member, the first body coupling member, the second body coupling member, the third body coupling member, the first wall part, and the second wall part. In such a configuration, the front steering coupling member and the rear steering coupling member are connected to the third body coupling member through the substantially flat fifth wall part and sixth wall part. Thus, when the load input from the steering is transmitted from the front steering coupling member and the rear steering coupling member to the third body coupling member, the stress is less likely to be concentrated on a specific part. As a result, the stiffness of the steering support can be further improved.

BRIEF DESCRIPTION OF THE DRAWINGS

Example embodiments of the present disclosure will be described with reference to the drawings, in which:

FIG. 3 is a top view of the steering support;

FIG. 4 is a bottom view of the steering support;

DETAILED DESCRIPTION OF EXEMPLARY EMBODIMENTS

1. Overall Configuration

A steering support 1 shown in FIGS. 1 to 8 is a device to be mounted on a vehicle in a state of being extended in a vehicle-width direction (in other words, a right-left direction of the vehicle) to support a steering 100 of the vehicle. Hereinafter, front, back, right, and left of the vehicle are simply described as front, back right, and left.

The steering support 1 is formed of aluminum, magnesium, and resin, for example. In this embodiment, the steering support 1 is integrally molded by die-casting. The integral molding by die-casting allows to provide the steering support 1 with fewer joined portions than a case where several members are joined by welding or the like. A detailed configuration of the steering support 1 is described below.

The steering support 1 of this embodiment is used for a vehicle in which a driver's seat is provided on the left side, and the steering support 1 is arranged in front of the driver's seat. The steering support 1 comprises a front end to be fixed to the body of the vehicle provided in front of the driver's seat of the vehicle. The steering support 1 comprises a left end to be fixed to a driver side pillar 201 shown in FIGS. 1 and 3. The driver side pillar 201 is a member constituting the body of the vehicle provided near a door on a driver's seat side. The steering support 1 comprises a right end to be fixed to a left end of a steering member 202. The steering member 202 is a pipe-shaped member constituting a part of the body of the vehicle, and arranged in front of a passenger seat of the vehicle in a state of being linearly extended in the right-left direction. The cross-sectional shape of the steering member perpendicular to a central axis thereof is not necessarily a circular shape but may be any other shape, for example, a polygonal shape.

Figure 1:
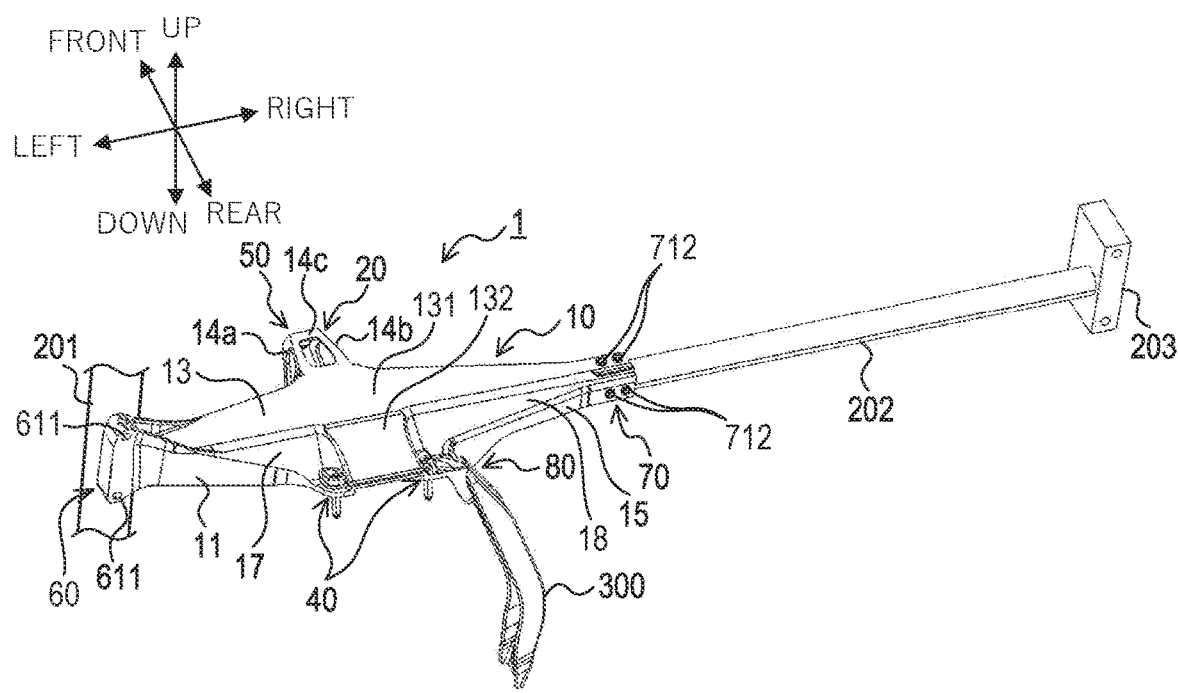
FIG. 1 is a perspective view of a steering support seen from the rear.

The steering member 202 comprises a right end to be fixed to the body of the vehicle (e.g. a passenger side pillar that is not illustrated) through a bracket 203 shown in FIG. 1. The steering member 202 also comprises a left end to be fixed to the steering support 1. That is, the steering member 202 connects the steering support 1 with the passenger side pillar, and the bracket 203 fixes the steering member 202 to the passenger side pillar. In this embodiment, the steering member 202 is fixed to the right end of the steering support 1. However, the left end of the steering member 202 may be fixed to a central portion of the steering support 1 in the right-left direction or a left portion of the steering support 1, for example.

Figure 7:
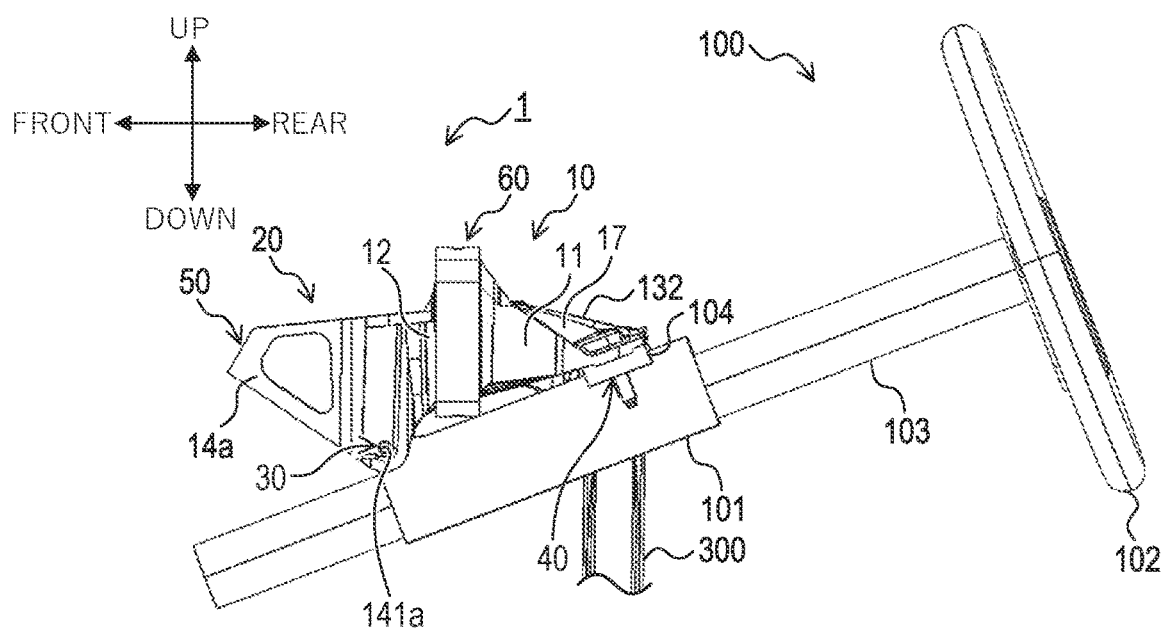
FIG. 7 is a left side view of the steering support.
Figure 8:
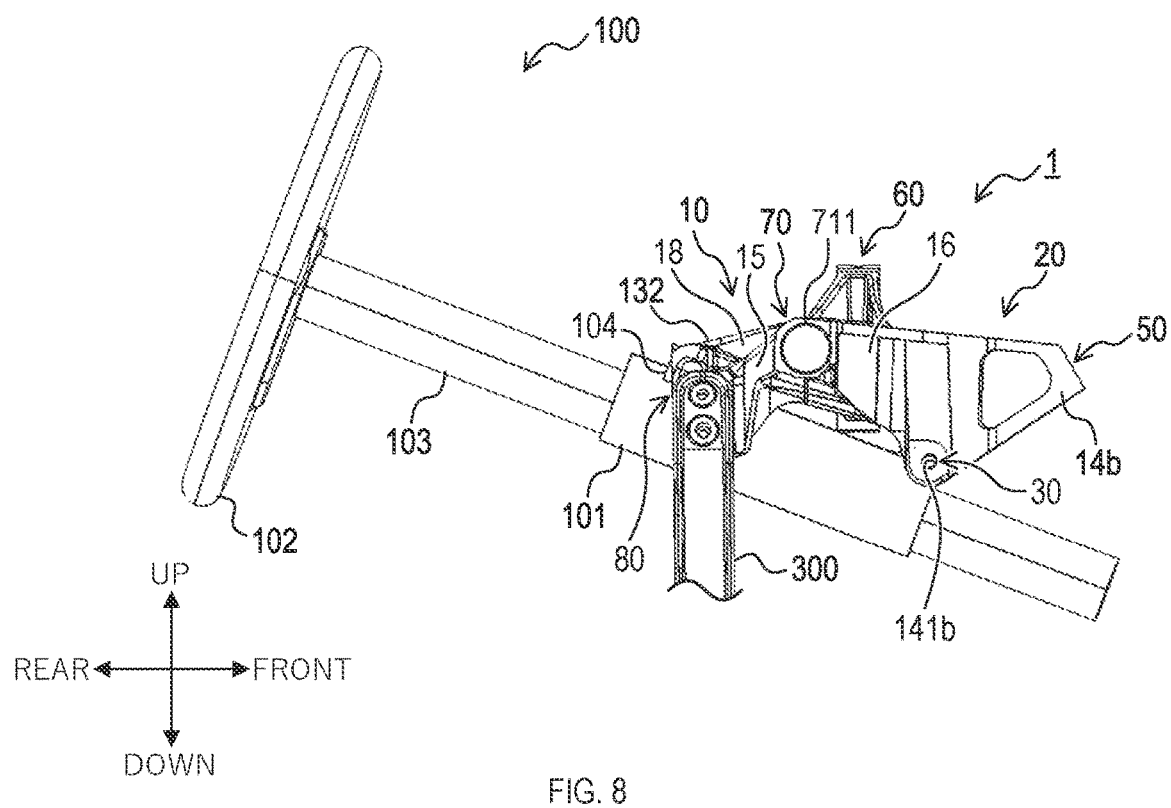
FIG. 8 is a right side view of the steering support.

As shown in FIGS. 7 and 8, the steering support 1 supports a steering column 101 in a steering 100 from above. The steering column 101 is a part surrounding an outer peripheral surface of a steering shaft 103 that is configured to transmit a rotation operation applied to a handle 102 to a steering mechanism.

2. Configuration of Steering Support

As shown in FIGS. 1 to 8, the steering support 1 includes a main body 10, a projection 20, a front steering coupling member 30, a rear steering coupling member 40, a first body coupling member 50, a second body coupling member a third body coupling member 70, and a floor brace coupling member 80.

As mentioned above, the steering support 1 is integrally molded by die-casting. That is, the main body 10, the projection 20, the front steering coupling member 30, the rear steering coupling member 40, the first body coupling member 50, the second body coupling member 60, the third body coupling member 70, and the floor brace coupling member 80 are integrally molded by die-casting.

2-1. Main Body

Figure 2:
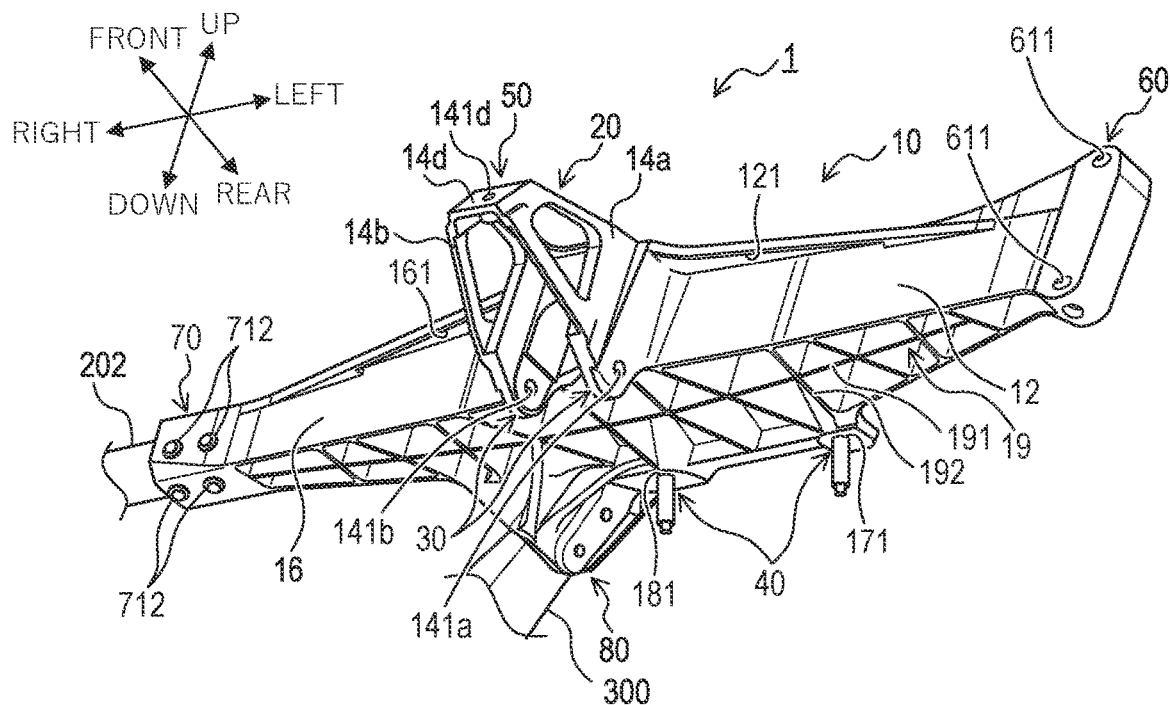
FIG. 2 is a perspective view of the steering support seen from the front.
Figures 3, 4:
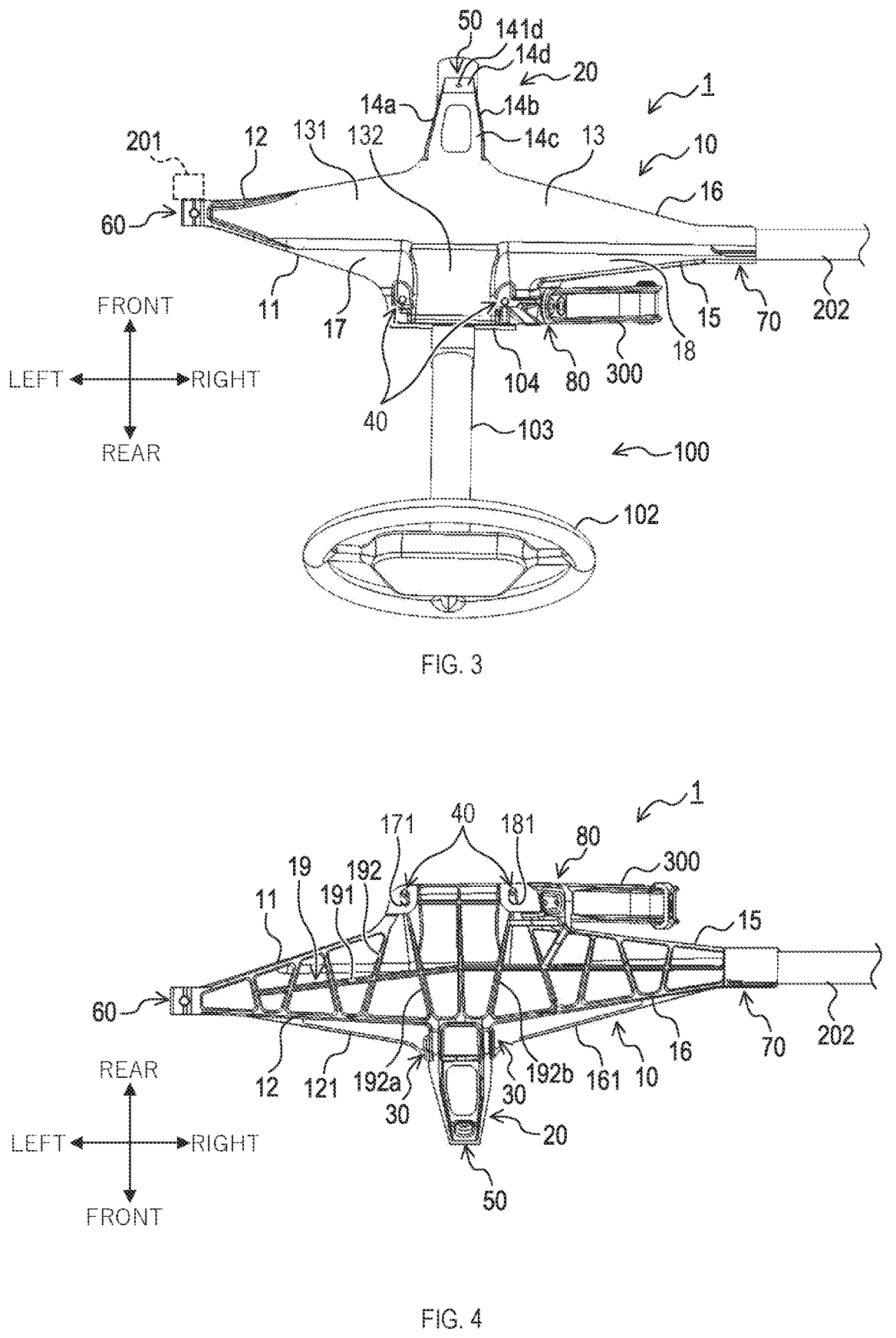

As shown in FIGS. 1 and 3, the main body 10 has a parallelogram shape in the top view of the steering support 1. The main body 10 is arranged in front of the driver's seat so that a length of the main body 10 in the right-left direction is larger than a length thereof in a front-rear direction. As shown in FIG. 2, the main body 10 has a box-like shape with one surface open. In this embodiment, the bottom surface of the main body 10 is open. Note that a configuration may be adopted in which the top surface of the main body is open.

As shown in FIGS. 1 to 8, the main body 10 comprises a left rear wall 11, a left front wall 12, a main body upper wall 13, a right rear wall 15, a right front wall 16, a left coupling wall 17, a right coupling wall 18, a left rib 121, a right rib 161, and a reinforcing member 19.

The main body upper wall 13 constitutes the top surface of the main body 10 and has a plate shape. The main body upper wall 13 extends in the right-left direction and the front-rear direction, and has a substantially flat surface. In this embodiment, a surface of the substantially flat surface includes a flat surface and a non-flat surface that is not perfectly flat and that has a slight curvature or a slight bend. The main body upper wall 13 comprises a front portion 131 and a rear portion 132 located rearward of the front portion 131. The rear portion 132 extends backward and downward with a gentle slope from the front portion 131, and is provided to a middle part of the front portion 131 in the right-left direction. In other words, the main body upper wall 13 has a bent portion, and the rear portion 132 slightly bends relative to the front portion 131. The main body upper wall may have a shape in which the front portion and the rear portion extend in the same plane.

Figure 5:
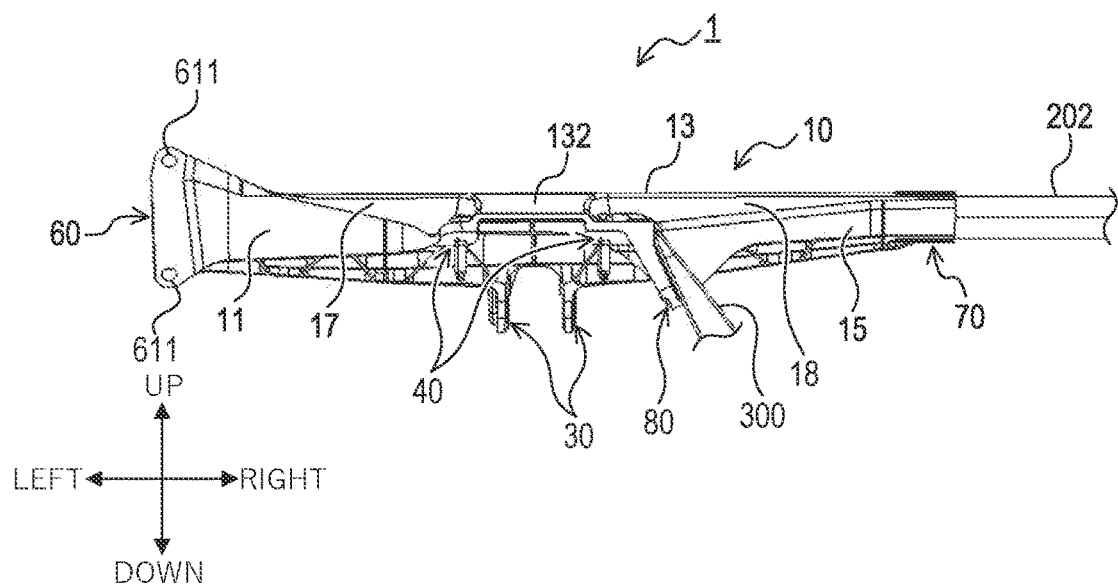
FIG. 5 is a rear view of the steering support.

The left rear wall 11 constitutes a side surface located in the left rear of the main body 10 and has a plate shape. The left rear wall 11 extends in the right-left direction and an up-down direction, and has a substantially flat surface. The left rear wall 11 extends downward substantially perpendicularly to the front portion 131 of the main body upper wall 13. As shown in FIG. 5, the left rear wall 11 has a substantially triangular shape. In the left rear wall 11, a left end of the left rear wall 11 has a length in the up-down direction larger than that of a right end of the left rear wall 11. The right end of the left rear wall 11 is connected to the rear portion 132 of the main body upper wall 13.

Figure 6:
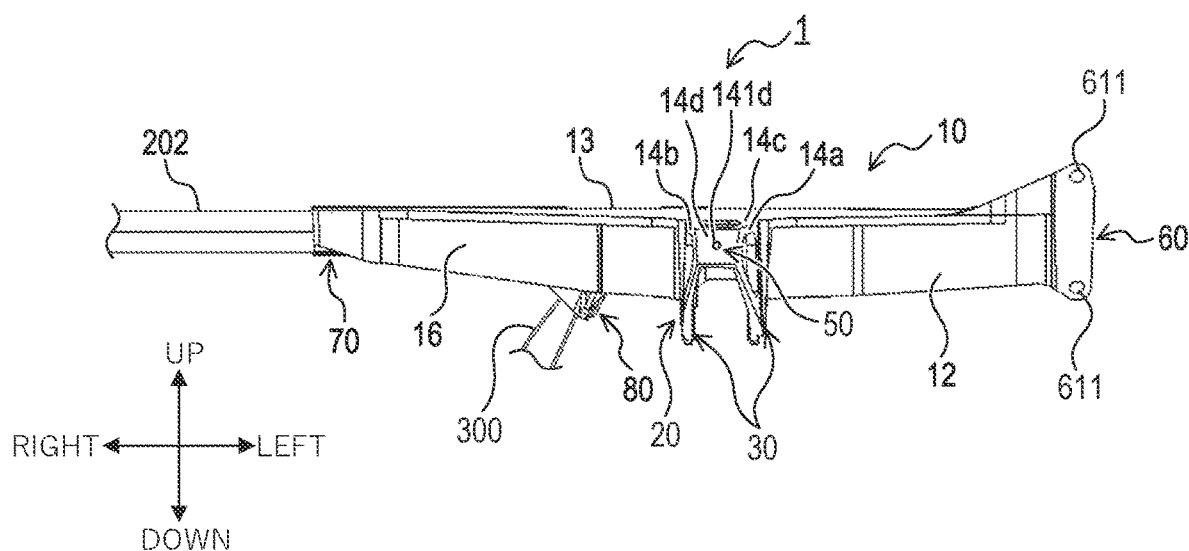
FIG. 6 is a front view of the steering support.

The left front wall 12 constitutes a side surface located in the left front of the main body 10 and has a plate shape. The left front wall 12 extends in the right-left direction and the up-down direction, and has a substantially flat surface. The left front wall 12 extends downward substantially perpendicularly from a front end of the front portion 131 of the main body upper wall 13. As shown in FIG. 6, the left front wall 12 has a shape in which a length in the right-left direction is larger than a length in the up-down direction, and the length in the up-down direction is not constant. The length in the up-down direction of the left front wall may be constant. The left front wall 12 is located in front of the left rear wall 11, and arranged to face the left rear wall 11. The interval between the left rear wall 11 and the left front wall 12 is gradually narrowed toward the left. The left rear wall 11 and the left front wall 12 are connected to each other at their respective left ends through the front portion 131 of the main body upper wall 13.

The right rear wall 15 constitutes a side surface located in the right rear of the main body 10 and has a plate shape. The right rear wall 15 extends in the right-left direction and the up-down direction, and has a substantially flat surface. The right rear wall 15 extends downward substantially perpendicularly to the main body upper wall 13. As shown in FIG. 5, the right rear wall 15 has a shape in which a length in the right-left direction is larger than a length in the up-down direction, and the length in the up-down direction is not constant. The length in the up-down direction of the right rear wall may be constant. The right rear wall 15 is located on the right of the left rear wall 11. The rear portion 132 of the main body upper wall 13 is located between the left rear wall 11 and the right rear wall 15. The left end of the right rear wall 15 is connected to the rear portion 132 of the main body upper wall 13.

The right front wall 16 constitutes a side surface located in the right front of the main body 10 and has a plate shape. The right front wall 16 extends in the right-left direction and the up-down direction, and has a substantially flat surface. The right front wall 16 extends downward substantially perpendicularly from the front end of the front portion 131 of the main body upper wall 13. As shown in FIG. 6, the right front wall 16 has a shape in which a length in the right-left direction is larger than a length in the up-down direction, and the length in the up-down direction is not constant. The length in the up-down direction of the right front wall may be constant. The right front wall 16 is located on the right of the left front wall 12. The projection 20 described below is located between the left front wall 12 and the right front wall 16. The right front wall 16 is located in front of the right rear wall 15, and arranged to face the right rear wall 15. The interval between the right rear wall 15 and the right front wall 16 is gradually narrowed toward the right. The right rear wall and the right front wall 16 are connected to each other at their respective right ends through the front portion 131 of the main body upper wall 13.

As shown in FIGS. 1, 3 and 5, the left coupling wall 17 connects the left rear wall 11, the front portion 131 of the main body upper wall 13, and the rear portion 132 of the main body upper wall 13 to each other, and the left coupling wall 17 has a plate shape.

The right coupling wall 18 connects the right rear wall 15, the front portion 131 of the main body upper wall 13, and the rear portion 132 of the main body upper wall 13 to each other, and the right coupling wall 18 has a plate shape.

The left rib 121 extends forward from the front end of the front portion 131 in an area positioned on the left of the projection 20 described below in the front portion 131 of the main body upper wall 13, and the left rib 121 has a plate shape. The left rib 121 is provided in continuity with the front portion 131 so as to be arranged in the same plane as the front portion 131. In other words, the left rib 121 extends forward substantially perpendicularly to the left front wall 12. The left rib is not necessarily arranged on the plane same as the front portion 131. The left rib may be provided on the left front wall 12, for example. As shown in FIG. 4, the left rib 121 extends in the right-left direction and the front-rear direction and has a substantially flat surface. The left rib 121 has a substantially triangular shape in the bottom view of the steering support 1. In the left rib 121, the right end of the left rib 121 has a length in the front-rear direction larger than that of the left end of the left rib 121. The right end of the left rib 121 is connected to the projection 20 described below. The right end of the left rib 121 is preferably enlarged in the front-rear direction to extend to a position closer to a leading end of the projection 20 described below.

The right rib 161 extends forward from the front end of the front portion 131 in an area positioned on the right of the projection 20 described below in the front portion 131 of the main body upper wall 13, and the right rib 161 has a plate shape. The right rib 161 is provided in continuity with the front portion 131 so as to be arranged in the same plane as the front portion 131. In other words, the right rib 161 extends forward substantially perpendicularly to the right front wall 16. The right rib is not necessarily arranged on the plane same as the front portion 131. The right rib may be provided on the right front wall 16, for example. The right rib 161 extends in the right-left direction and the front-rear direction, and has a substantially flat surface. The right rib 161 has a substantially triangular shape in the bottom view of the steering support 1. In the right rib 161, a left end of the right rib 161 has a length in the front-rear direction larger than that of a right end of the right rib 161. The left end of the right rib 161 is connected to the projection 20 described below. Similarly to the right end of the left rib 121, it is also preferable that the left end of the right rib 161 is enlarged in the front-rear direction so as to extend to a position closer to the leading end of the projection 20 described below.

The reinforcing member 19 is arranged in an internal space enclosed by the left rear wall 11, the left front wall 12, the main body upper wall 13, the right rear wall 15, and the right front wall 16, and the reinforcing member 19 has a plate shape. The reinforcing member 19 extends downward substantially perpendicularly from the main body upper wall 13. The reinforcing member 19 comprises a first reinforcing part 191 extending in the right-left direction and multiple second reinforcing parts 192 extending in the front-rear direction and arranged at intervals from each other in the left-right direction. The multiple second reinforcing parts 192 are arranged to intersect with the first reinforcing part 191. In this embodiment, the multiple second reinforcing parts 192 are arranged so that neighboring two second reinforcing parts 192 are not in parallel with each other. Specifically, the neighboring two second reinforcing parts 192 are inclined at different angles relative to the first reinforcing part 191. The multiple second reinforcing parts may be arranged so that the neighboring two second reinforcing parts are arranged in parallel with each other. The reinforcing member may be either one of the first reinforcing part and the second reinforcing parts, and/or may comprise other reinforcing parts. Among the multiple second reinforcing parts 192, two second reinforcing parts 192a, 192b shown in FIG. 4 are arranged along a substantially straight line connecting the front steering coupling member 30 and the rear steering coupling member 40, which are described below.

2-2. Projection

The projection 20 is located in a front part of the main body 10 in the middle of the main body 10 in the right-left direction, and the projection 20 protrudes forward from the main body 10. Specifically, the projection 20 is located between the left front wall 12 and the right front wall 16. The leading end of the projection 20 is fixed to the body of the vehicle provided in front of the driver's seat of the vehicle. As shown in FIGS. 1, 2, and 3, the projection comprises a left wall 14a, a right wall 14b, a projecting top wall 14c, and a front wall 14d.

The left wall 14a and the right wall 14b constitute side surfaces located on the left and right of the projection 20 and each have a plate shape. The left wall 14a and the right wall 14b each extend in the front-rear direction and the up-down direction, and have a substantially flat surface. The left wall 14a and the right wall 14b are arranged to face each other with an interval in the right-left direction. The interval between the left wall 14a and the right wall 14b are gradually narrowed toward the front. The left wall 14a located on the left is connected to the right end of the left front wall 12. The right wall 14b located on the right is connected to the left end of the right front wall 16.

The projecting top wall 14c protrudes forward from a middle part of the front portion 131 of the main body upper wall 13, constitutes the top surface of the projection 20, and has a plate shape. The projecting top wall 14c is provided in continuity with the front portion 131 so as to be arranged in the same plane as the front portion 131. The projecting top wall 14c extends in the front-rear direction and the right-left direction, and has a substantially flat surface. The projecting top wall 14c is located between the left wall 14a and the right wall 14b, and connects the left wall 14a and the right wall 14b.

The front wall 14d extends downward to bend from the front end of the projecting top wall 14c to constitute a sidewall located at the front of the projection 20, and the front wall 14d has a plate shape. The front wall 14d extends in the right-left direction and the up-down direction, and has a substantially flat surface. The front wall 14d is located between the left wall 14a and the right wall 14b and connects the left wall 14a, the right wall 14b and the projecting top wall 14c.

The left wall 14a, the right wall 14b, and the projecting top wall 14c each comprise a hole penetrating through a central area of each of the walls 14a, 14b, and 14c. With these holes, the projection 20 is easily broken when the vehicle receives an impact from the front, making it possible to absorb the impact.

2-3. Coupling Members of Steering Support to be Coupled to Steering

As described above, the steering support 1 supports the steering column 101 from above, thereby supporting the steering 100. Specifically, the front steering coupling member 30 and rear steering coupling member 40 of the steering support 1 are coupled to the steering column 101.

<Front Steering Coupling Member>

As shown in FIGS. 2, 7, and 8, the front steering coupling member 30 is formed in the projection 20. In this embodiment, the front steering coupling member 30 comprises a first through hole 141a penetrating through the left wall 14a in the right-left direction and a first through hole 141b penetrating through the right wall 14b in the right-left direction. The first through hole 141a is formed in a rear area of a lower end part of the left wall 14a, and the first through hole 141b is formed in a rear area of a lower end part of the right wall 14b. That is, the front steering coupling member 30 is provided near the right end of the left front wall 12 and near the left end of the right front wall 16.

The steering column 101 comprises two bolt holes (not shown) in a front end thereof, one of which is formed in a right wall and the other is formed in a left wall of the steering column 101. The bolt hole penetrates through each of the right and left walls in the right-left direction, and through the bolt hole, a threaded portion of a bolt can be inserted. The steering column 101 is arranged between the left wall 14a and the right wall 14b. The threaded portions of the bolts are inserted into the two first through holes 141a, 141b and the left and right bolt holes of the steering column 101. The steering 100 is thereby coupled to the projection 20.

<Rear Steering Coupling Member>

The rear steering coupling member 40 is provided rearward of the front steering coupling member 30. Specifically, as shown in FIGS. 1, 3 and 5, the rear steering coupling member 40 is provided to the main body 10. In this embodiment, the rear steering coupling member 40 comprises a second through hole 171 shown in FIG. 2 penetrating through the left coupling wall 17 in the up-down direction and a second through hole 181 shown in FIG. 2 penetrating through the right coupling wall 18 in the up-down direction. The second through hole 171 is formed in the left coupling wall 17 between the rear portion 132 of the main body upper wall 13 and a right end of the left rear wall 11. The second through hole 181 is formed in the right coupling wall 18 between the rear portion 132 of the main body upper wall 13 and a left end of the right rear wall That is, the rear steering coupling member 40 is formed near the right end of the left rear wall 11 and near the left end of the right rear wall 15.

As shown in FIGS. 7 and 8, the steering column 101 comprises an attaching portion 104 extending in the right-left direction and formed in the upper rear end of the steering column 101. The attaching portion 104 comprises two bolt holes (not shown) arranged with an interval in the right-left direction. The bolt holes penetrate through the attaching portion 104 in the up-down direction, and through the bolt holes, threaded portions of bolts are inserted. The main body 10 is arranged on the steering column 101 so that the rear portion 132 of the main body upper wall 13 is located between the two bolt holes of the attaching portion 104. The threaded portions of the bolts are inserted into the two second through holes 171, 181 and the two bolt holes in the attaching portion 104. The steering 100 is thereby coupled to the main body 10.

2-4. Coupling Members of Steering Support to be Coupled to Body of Vehicle

As mentioned above, the front end of the steering support 1 is fixed to the body of the vehicle provided in front of the driver's seat of the vehicle, and the left end of the steering support 1 is fixed to the driver side pillar 201, and the right end of steering support 1 is fixed to the left end of the steering member 202. Specifically, the first body coupling member 50 is coupled to the body of the vehicle provided in front of the driver's seat of the vehicle, and the second body coupling member 60 is coupled to the driver side pillar 201, and the third body coupling member 70 is coupled to the steering member 202.

<First Body Coupling Member>

As shown in FIGS. 1 to 8, the first body coupling member 50 is located at the front end of the steering support 1. Specifically, the first body coupling member 50 is provided to the front wall 14d of the projection 20 of the steering support 1. In this embodiment, the first body coupling member 50 comprises a third through hole 141d shown in FIGS. 2 and 3 penetrating through the front wall 14d in the front-rear direction.

A threaded portion of a bolt is inserted into the third through hole 141d, whereby the steering support 1 is fastened to the body of the vehicle provided in front of the driver's seat of the vehicle.

<Second Body Coupling Member>

The second body coupling member 60 is located at the left end of the main body 10 of the steering support 1. The second body coupling member 60 connects the left end of the left rear wall 11, the left end of the left front wall 12, and the left end of the main body upper wall 13. In this embodiment, the second body coupling member 60 comprises at least one (for example, two) fourth through hole 611 shown in FIGS. 1 and 2 penetrating through the second body coupling member 60 in the front-rear direction.

A threaded portion of a bolt is inserted into at least one fourth through hole 611, whereby the steering support 1 is fastened to the driver side pillar 201.

<Third Body Coupling Member>

The third body coupling member 70 is located at the right end of the main body 10 of the steering support 1. The third body coupling member 70 connects the right end of the right rear wall 15, the right end of the right front wall 16, and the right end of the main body upper wall 13. In this embodiment, the third body coupling member 70 comprises an opening 711 shown in FIG. 8.

The left end of the steering member 202 is inserted into the opening 711, and fixed by eight bolts 712 shown in FIGS. 1 and 2, whereby the steering support 1 is fastened to the steering member 202. Note that the third body coupling member 70 and the steering member 202 may be fixed by, for example, press-fit or welding.

2-5. Floor Brace Coupling Member

The floor brace coupling member 80 is provided near the rear steering coupling member 40 of the main body 10. Specifically, as shown in FIGS. 1, 3, and 4, the floor brace coupling member 80 is provided to the right coupling wall 18 between the rear portion 132 of the main body upper wall 13 and the left end of the right rear wall 15, on the right of the second through hole 181. Note that the floor brace coupling member may be provided, for example, to the right rear wall 15 or the right coupling wall 18 at a position not closer to the rear steering coupling member 40. To the floor brace coupling member 80, an upper end portion of a floor brace 300 is fixed by a bolt or the like. The floor brace 300 extends upward from a part, in the body of the vehicle, located below the steering support 1.

2-6. Transmission Paths Connecting Between Steering Coupling Members and Body Coupling Members The above-described left rear wall 11 forms a substantially linear transmission path connecting the rear steering coupling member 40 and the second body coupling member 60 to each other. The transmission path is a path where a load input from the steering 100 is transmitted. In this embodiment, the rear steering coupling member 40 is located near the right end of the left rear wall 11, and the second body coupling member 60 is provided to the left end of the left rear wall 11. Thereby, the rear steering coupling member 40 and the second body coupling member 60 are connected to each other by the left rear wall 11.

The left front wall 12 forms a substantially linear transmission path connecting the front steering coupling member 30 and the second body coupling member 60 to each other. In this embodiment, the front steering coupling member 30 is located near the right end of the left front wall 12, and the second body coupling member 60 is provided to the left end of the left rear wall 11. Thereby, the front steering coupling member 30 and the second body coupling member 60 are connected to each other by the left front wall 12.

The main body upper wall 13 and the projecting top wall 14c form a substantially linear transmission path connecting the rear steering coupling member 40 and the first body coupling member 50 to each other. In this embodiment, the rear steering coupling member 40 is located near the rear end of the rear portion 132 of the main body upper wall 13. The first body coupling member 50 is located near the front end of the projecting top wall 14c. Thereby, the rear steering coupling member 40 and the first body coupling member 50 are connected to each other by the main body upper wall 13 and the projecting top wall 14c.

The left wall 14a and the right wall 14b form a substantially linear transmission path connecting the front steering coupling member 30 and the first body coupling member 50 to each other. In this embodiment, the front steering coupling member 30 is located near the rear ends of the left wall 14a and the right wall 14b. The first body coupling member 50 is located near the front ends of the left wall 14a and the right wall 14b. Thereby, the front steering coupling member 30 and the first body coupling member 50 are connected to each other by the left wall 14a and the right wall 14b.

The right rear wall 15 forms a substantially linear transmission path connecting the rear steering coupling member 40 and the third body coupling member 70 to each other. In this embodiment, the rear steering coupling member 40 is located near the left end of the right rear wall 15, and the third body coupling member 70 is provided to the right end of the right rear wall 15. Thereby, the rear steering coupling member 40 and the third body coupling member 70 are connected to each other by the right rear wall 15.

The right front wall 16 forms a substantially linear transmission path connecting the front steering coupling member 30 and the third body coupling member 70 to each other. In this embodiment, the front steering coupling member 30 is located near the left end of the right front wall 16, and the third body coupling member 70 is provided to the right end of the right front wall 16.

Thereby, the front steering coupling member 30 and the third body coupling member 70 are connected to each other by the right front wall 16.

2-7. Transmission Paths Connecting Between Body Coupling Members

The above-mentioned left rib 121 is located between the first body coupling member 50 and the second body coupling member 60, and forms a transmission path connecting the first body coupling member 50 and the second body coupling member 60 to each other. In this embodiment, the first body coupling member 50 is located near the right end of the left rib 121, and the second body coupling member 60 is located near the left end of the left rib 121. Thereby, the first body coupling member 50 and the second body coupling member 60 are connected to each other by the left rib 121.

The right rib 161 is located between the first body coupling member 50 and the third body coupling member 70, and forms a transmission path connecting the first body coupling member 50 and the third body coupling member 70 to each other. In this embodiment, the first body coupling member 50 is located near the left end of the right rib 161, and the third body coupling member 70 is located near the right end of the right rib 161. Thereby, the first body coupling member 50 and the third body coupling member 70 and are connected to each other by the right rib 161.

3. Effects

In the embodiment detailed above, the following effects can be obtained.

(3a) In this embodiment, the main body 10, the projection 20, the front steering coupling member 30, the rear steering coupling member 40, the first body coupling member 50, the second body coupling member 60, the third body coupling member 70, and the floor brace coupling member 80 are integrally molded by die-casting. More specifically, the left rear wall 11, the left front wall 12, the main body upper wall 13, the left wall 14a, the right wall 14b, the projecting top wall 14c, the front wall 14d, the right rear wall 15, the right front wall 16, the left coupling wall 17, the right coupling wall 18, the left rib 121, the right rib 161, the reinforcing member 19, the front steering coupling member 30, the rear steering coupling member 40, the first body coupling member 50, the second body coupling member 60, the third body coupling member 70, and the floor brace coupling member 80 are integrally molded by die-casting. The integral molding by die-casting allows to provide the steering support 1 with fewer joined portions than a case where several members are joined by welding or the like.

Here, if there are some joined portions, a stress is easily concentrated on the joined portions since the load input from the steering 100 is transmitted to the body of the vehicle via the joined portions. However, the steering support 1 of this embodiment integrally molded by die-casting has fewer joined portions, whereby the concentration of the stress is less likely to occur in comparison with a configuration with many joined portions.

The die-casting enables highly flexible structural requirements, making it possible to easily form a shape with high stiffness. Thus, it is possible to achieve a space reduction by reducing the spatial volume of the steering support 1 itself, and also achieve a weight reduction within a range where a target stiffness can be realized.

(3b) In this embodiment, the steering support 1 comprises the substantially flat left rear wall 11 and left front wall 12 forming the transmission paths connecting the front steering coupling member 30 and the rear steering coupling member 40 to the second body coupling member 60. Thus, it is possible to reduce the lengths of parts connecting the rear steering coupling member 40 to the second body coupling member 60, and the front steering coupling member to the second body coupling member 60. In other words, it is possible to shorten the lengths of the transmission paths connecting the rear steering coupling member 40 to the second body coupling member 60, and the front steering coupling member 30 to the second body coupling member 60. Therefore, the load input from the front steering coupling member 30 and rear steering coupling member 40 is more smoothly transmitted to the second body coupling member 60. That is, when the load input from the steering 100 is transmitted from the front steering coupling member 30 and the rear steering coupling member 40 to the second body coupling member 60, the stress is less likely to be concentrated on a specific part.

The steering support 1 also comprises the substantially flat main body upper wall 13, left wall 14a, right wall 14b and projecting top wall 14c forming the transmission paths connecting the front steering coupling member 30 and the rear steering coupling member 40 to the first body coupling member 50. Thus, it is possible to reduce the lengths of parts connecting the rear steering coupling member 40 to the first body coupling member 50, and the front steering coupling member 30 to the first body coupling member 50. In other words, it is possible to shorten the lengths of the transmission paths connecting the rear steering coupling member 40 to the first body coupling member 50, and the front steering coupling member 30 to the first body coupling member 50. Therefore, the load input from the front steering coupling member 30 and rear steering coupling member 40 is more smoothly transmitted to the first body coupling member 50. That is, when the load input from the steering 100 is transmitted from the front steering coupling member 30 and the rear steering coupling member 40 to the first body coupling member 50, the stress is less likely to be concentrated on a specific part.

The steering support 1 also comprises the substantially flat right rear wall 15 and right front wall 16 forming the transmission paths connecting the front steering coupling member 30 and the rear steering coupling member 40 to the third body coupling member 70. Thus, it is possible to reduce the lengths of parts connecting the rear steering coupling member 40 to the third body coupling member 70, and the front steering coupling member 30 to the third body coupling member 70. In other words, it is possible to shorten the lengths of the transmission paths connecting the rear steering coupling member 40 to the third body coupling member 70, and the front steering coupling member 30 to the third body coupling member 70. Therefore, the load input from the front steering coupling member 30 and rear steering coupling member 40 is more smoothly transmitted to the third body coupling member 70. That is, when the load input from the steering 100 is transmitted from the front steering coupling member 30 and the rear steering coupling member 40 to the third body coupling member 70, the stress is less likely to be concentrated on a specific part. As a result, it is possible to improve the stiffness of the steering support. With the increased stiffness of the steering support 1, it is possible to improve steering feeling of the steering 100.

(3c) In this embodiment, the steering support 1 comprises the substantially flat left rib 121 and right rib 161 forming the transmission paths connecting the first body coupling member 50 to the second body coupling member 60 and the third body coupling member 70. Thus, it is possible to reduce the lengths of parts connecting the first body coupling member 50 to the second body coupling member 60, and the first body coupling member 50 to the third body coupling member 70. In other words, it is possible to shorten the lengths of the transmission paths connecting the first body coupling member 50 to the second body coupling member 60 and the first body coupling member 50 to the third body coupling member 70. Therefore, the stress generated in each of the first body coupling member 50 and the second body coupling member 60 by the transmission of the load input from steering 100 can be more smoothly distributed between the first body coupling member 50 and the second body coupling member 60. The stress generated in each of the first body coupling member 50 and the third body coupling member 70 by the transmission of the load input from steering 100 can be more smoothly distributed between the first body coupling member 50 and the third body coupling member 70. Therefore, it is possible to inhibit the concentration of stress in any one of the body coupling members of the first body coupling member 50, the second body coupling member 60, and third body coupling member 70. As a result, it is possible to further improve the stiffness of the steering support.

In this embodiment, the driver side pillar 201, the passenger side pillar, and the steering member 202 correspond to one example of the body of the vehicle. The left rear wall 11 corresponds to one example of the first wall part, the left front wall 12 corresponds to one example of the second wall part, the main body upper wall 13 and the projecting top wall 14c correspond to one example of the third wall part, and the left wall 14a and the right wall 14b correspond to one example of the fourth wall part. The right rear wall 15 corresponds to one example of the fifth wall part, and the right front wall 16 corresponds to one example of the sixth wall part. The left end of the steering support 1 corresponds to one example of the first end, the right end of the steering support 1 corresponds to one example of the second end, and the left rib 121 corresponds to one example of the rib.

4. Other Embodiments

Although the embodiment of the present disclosure has been described above, it should be appreciated that the present disclosure is not limited to the above embodiment and can take various forms.

(4a) In the above-described embodiment, a configuration has been exemplified in which the steering support 1 is connected to the body of the vehicle by three coupling members of the first body coupling member 50, the second body coupling member 60, and the third body coupling member 70. However, the portions of the steering support to be coupled to the body of the vehicle are not limited to the above-described three coupling members, and other coupling members may be provided. For example, the steering support may have another coupling member at the front end thereof to be coupled to the body of the vehicle in a position different from the first body coupling member 50.

(4b) In the above-described embodiment, a configuration has been exemplified in which the steering support 1 is integrally molded by die-casting; however, the integral molding method is not limited to the die-casting. For example, the steering support may be integrally molded by extrusion molding, press molding, injection molding or molding with 3D printer.

(4c) In the above-described embodiment, a configuration has been exemplified in which the third body coupling member 70 located at the right end of the steering support 1 is coupled to the steering member 202. However, for example, the third body coupling member located at the right end of the steering support may be configured to be directly coupled to the passenger side pillar, thereby being coupled to the body of the vehicle. That is, the steering support may be fastened to the passenger side pillar by inserting a threaded portion of a bolt into the through hole provided in the third body coupling member located at respective right ends of the right rear wall, the right front wall, and the main body upper wall which are formed to extend long in the right-left direction.

(4d) In the above-described embodiment, a configuration has been exemplified in which the floor brace 300 is fastened to the floor brace coupling member 80 of the steering support 1; however, for example, a configuration may be adopted in which the floor brace itself is integrally molded with the steering support.

(4e) In the above described embodiment, a configuration has been exemplified in which the first body coupling member 50, the second body coupling member 60, and the third body coupling member 70 are fixed to the body of the vehicle by being fastened with bolts or the like; however, the method for coupling the steering support to the body of the vehicle is not limited to this configuration. For example, the steering support and the body of the vehicle may be fixed by welding or the like.

(4f) In the above-described embodiment, a configuration has been exemplified in which the steering support 1 supports, from above, the steering 100 of the vehicle in which the driver's seat is installed on the left. However, the steering support having the same configuration as the above-described embodiment may support the steering of a vehicle in which the driver's seat is installed on the right. The steering support may be configured to support the steering 100 from below.

(4g) In the above-described embodiment, a configuration has been exemplified in which the main body 10 has a parallelogram-shape in the top view and comprises the left rear wall 11, the left front wall 12, the main body upper wall 13, the right rear wall 15, the right front wall 16, the left coupling wall 17, the right coupling wall 18, the left rib 121, the right rib 161 and the reinforcing member 19. However, the main body 10 is not limited to this configuration. For example, the main body may be various shapes, such as rectangular shapes and diamond shapes. For example, the main body may be configured not to comprise at least one of the main body upper wall, the right rear wall, the right front wall, the left coupling wall, the right coupling wall, the left rib, the right rib, and the reinforcing member.

(4h) A function served by a single element in any of the above-described embodiments may be achieved by a plurality of elements, or functions served by a plurality of elements may be achieved by a single element. A part of the configurations of the aforementioned embodiments may be omitted. At least part of the configurations of the above-described embodiments may be added to or replaced with the configurations of the other above-described embodiments.

[Technical Ideas Disclosed Herein]

[Item 1]

A steering support configured to be installed in a vehicle in a state of being extended in a vehicle-width direction to support a steering of the vehicle, the steering support comprising:
- a front steering coupling member that is a part configured to be coupled to the steering;
- a rear steering coupling member that is a part provided rearward of the front steering coupling member and configured to be coupled to the steering;
- a first body coupling member that is a part located at a front end in a front-rear direction of the vehicle and configured to be coupled to a body of the vehicle;
- a second body coupling member that is a part located at a first end in the vehicle-width direction and configured to be coupled to the body of the vehicle;
- a third body coupling member that is a part located at a second end in the vehicle-width direction and configured to be coupled to the body of the vehicle;
- a first wall part connecting the rear steering coupling member and the second body coupling member to each other and having a substantially flat surface; and
- a second wall part connecting the front steering coupling member and the second body coupling member to each other and having a substantially flat surface,
- wherein the front steering coupling member, the rear steering coupling member, the first body coupling member, the second body coupling member, the third body coupling member, the first wall part, and the second wall part are made by an integral molding.

[Item 2]

The steering support according to item 1,
wherein the integral molding is performed by die-casting.

[Item 3]

The steering support according to item 1 or 2, further comprising:
- a third wall part connecting the rear steering coupling member and the first body coupling member to each other and having a substantially flat surface; and
- a fourth wall part connecting the front steering coupling member and the first body coupling member to each other and having a substantially flat surface,
- wherein the third wall part and the fourth wall part are made by the integral molding together with the front steering coupling member, the rear steering coupling member, the first body coupling member, the second body coupling member, the third body coupling member, the first wall part, and the second wall part.

[Item 4]

The steering support according to any one of item 1 to 3, further comprising a rib located between the first body coupling member and the second body coupling member, the rib extending from the second wall part, and the rib having a substantially flat surface,
wherein the rib is made by the integral molding together with the front steering coupling member, the rear steering coupling member, the first body coupling member, the second body coupling member, the third body coupling member, the first wall part, and the second wall part.

What is claimed is:

1. A steering support configured to be installed in a vehicle in a state of being extended in a vehicle-width direction to support a steering of the vehicle, the steering support comprising:
   - a front steering coupling member that is a part configured to be coupled to the steering;
   - a rear steering coupling member that is a part provided rearward of the front steering coupling member and configured to be coupled to the steering;
   - a first body coupling member that is a part located at a front end in a front-rear direction of the vehicle and configured to be coupled to a body of the vehicle;
   - a second body coupling member that is a part located at a first end in the vehicle-width direction and configured to be coupled to the body of the vehicle;
   - a third body coupling member that is a part located at a second end in the vehicle-width direction and configured to be coupled to the body of the vehicle;
   - a first wall part connecting the rear steering coupling member and the second body coupling member to each other and having a substantially flat surface;
   - a second wall part connecting the front steering coupling member and the second body coupling member to each other and having a substantially flat surface;
   - a third wall part connecting the rear steering coupling member and the first body coupling member to each other and having a substantially flat surface; and
   - a fourth wall part connecting the front steering coupling member and the first body coupling member to each other and having a substantially flat surface,
   - wherein the front steering coupling member, the rear steering coupling member, the first body coupling member, the second body coupling member, the third body coupling member, the first wall part, the second wall part, the third wall part and the fourth wall part are made together by an integral molding, and
   - wherein the integral molding is performed by die-casting.

2. A steering support configured to be installed in a vehicle in a state of being extended in a vehicle-width direction to support a steering of the vehicle, the steering support comprising:
   - a front steering coupling member that is a part configured to be coupled to the steering;
   - a rear steering coupling member that is a part provided rearward of the front steering coupling member and configured to be coupled to the steering;
   - a first body coupling member that is a part located at a front end in a front-rear direction of the vehicle and configured to be coupled to a body of the vehicle;
   - a second body coupling member that is a part located at a first end in the vehicle-width direction and configured to be coupled to the body of the vehicle;
   - a third body coupling member that is a part located at a second end in the vehicle-width direction and configured to be coupled to the body of the vehicle;
   - a first wall part connecting the rear steering coupling member and the second body coupling member to each other and having a substantially flat surface;
   - a second wall part connecting the front steering coupling member and the second body coupling member to each other and having a substantially flat surface; and
   - a rib located between the first body coupling member and the second body coupling member, the rib extending from the second wall part, and the rib having a substantially flat surface,
   - wherein the front steering coupling member, the rear steering coupling member, the first body coupling member, the second body coupling member, the third body coupling member, the first wall part, the second wall part, and the rib are made together by an integral molding and wherein the integral molding is performed by die-casting.

3. A steering support configured to be installed in a vehicle in a state of being extended in a vehicle-width direction to support a steering of the vehicle the steering support comprising:

a front steering coupling member that is a part configured to be coupled to the steering;

a rear steering coupling member that is a part provided rearward of the front steering coupling member and configured to be coupled to the steering;

a first body coupling member that is a part located at a front end in a front-rear direction of the vehicle and configured to be coupled to a body of the vehicle;

a second body coupling member that is a part located at a first end in the vehicle-width direction and configured to be coupled to the body of the vehicle;

a third body coupling member that is a part located at a second end in the vehicle-width direction and configured to be coupled to the body of the vehicle;

a first wall part connecting the rear steering coupling member and the second body coupling member to each other and having a substantially flat surface;

a second wall part connecting the front steering coupling member and the second body coupling member to each other and having a substantially flat surface;

a fifth wall part connecting the rear steering coupling member and the third body coupling member to each other and having a substantially flat surface; and a sixth wall part connecting the front steering coupling member and the third body coupling member to each other and having a substantially flat surface, wherein the front steering coupling member, the rear steering coupling member, the first body coupling member, the second body coupling member, the third body coupling member, the first wall part, the second wall part, the fifth wall part, and the sixth wall part are made together by an integral molding, and wherein the integral molding is performed by die-casting.

4. The steering support according to claim 2, wherein the first body coupling member and the second body coupling member are connected to each other by the rib.

5. The steering support according to claim 4, further comprising:

a third wall part connecting the rear steering coupling member and the first body coupling member to each other and having a substantially flat surface; and a fourth wall part connecting the front steering coupling member and the first body coupling member to each other and having a substantially flat surface, wherein the third wall part and the fourth wall part are made by the integral molding together with the front steering coupling member, the rear steering coupling member, the first body coupling member, the second body coupling member, the third body coupling member, the first wall part, the second wall part, and the rib.

6. The steering support according to claim 4, further comprising:

a fifth wall part connecting the rear steering coupling member and the third body coupling member to each other and having a substantially flat surface; and a sixth wall part connecting the front steering coupling member and the third body coupling member to each other and having a substantially flat surface, wherein the fifth wall part and the sixth wall part are made by the integral molding together with the front steering coupling member, the rear steering coupling member, the first body coupling member, the second body coupling member, the third body coupling member, the first wall part, the second wall part, and the rib.

* * * * *